United States Patent
Mykytianskyi et al.

(10) Patent No.: US 12,184,689 B2
(45) Date of Patent: Dec. 31, 2024

(54) EFFICIENT CONNECTION PROCESSING

(71) Applicant: MELLANOX TECHNOLOGIES, LTD., Yokneam (IL)

(72) Inventors: Maksym Mykytianskyi, Kharkov (UA); Ron Yuval Efraim, Zur Hadasa (IL); Yossi Kuperman, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 300 days.

(21) Appl. No.: 17/830,380

(22) Filed: Jun. 2, 2022

(65) Prior Publication Data

US 2023/0016035 A1 Jan. 19, 2023

Related U.S. Application Data

(60) Provisional application No. 63/223,010, filed on Jul. 18, 2021, provisional application No. 63/221,961, filed on Jul. 15, 2021.

(51) Int. Cl.
*H04L 9/40* (2022.01)
*G06F 21/60* (2013.01)

(52) U.S. Cl.
CPC ...... *H04L 63/1458* (2013.01); *H04L 63/0236* (2013.01); *H04L 63/1416* (2013.01); *H04L 63/1425* (2013.01); *H04L 63/20* (2013.01)

(58) Field of Classification Search
CPC ............ H04L 63/1458; H04L 63/0236; H04L 63/1416; H04L 63/1425; H04L 63/20; H04L 2463/141; G06F 21/60
See application file for complete search history.

(56) References Cited

U.S. PATENT DOCUMENTS

| | | | |
|---|---|---|---|
| 9,749,354 B1 * | 8/2017 | Diggins | H04L 63/1458 |
| 11,108,812 B1 * | 8/2021 | Krishnan | H04L 45/64 |
| 2012/0227088 A1 * | 9/2012 | Gao | H04L 63/1458 726/3 |
| 2013/0263245 A1 * | 10/2013 | Sun | H04L 63/1458 726/12 |
| 2018/0034848 A1 * | 2/2018 | Jalan | H04L 63/1425 |
| 2022/0272071 A1 * | 8/2022 | Webb | H04L 63/1458 |

OTHER PUBLICATIONS

Signature-Based DDoS Attack Mitigation: Automated Generating Rules for Extended Berkeley Packet Filter and Express Data Path, by Wieren, published 2019 (Year: 2019).*
Brouer, "DDoS protection using Netfilter/iptables," Presentation, Red Hat, pp. 1-38, Feb. 2014 https://people.netfilter.org/hawk/presentations/devconf2014/iptables-ddos-mitigation_JesperBrouer.pdf.
Cole, "SYN cookies ate my dog—breaking TCP on Linux", pp. 1-13, Feb. 23, 2018 https://web.archive.org/web/20210507064902/https://kognitio.com/blog/syn-cookies-ate-my-dog-breaking-tcp-on-linux/.
Penkov et al., "Issuing SYN cookies in XDP—Netdev 0x14," Presentation, Google, pp. 1-18, Jun. 2020 https://legacy.netdevconf.info/0x14/pub/slides/50/Issuing%20SYN%20Cookies%20in%20XDP.pdf.

* cited by examiner

*Primary Examiner* — Vu V Tran
(74) *Attorney, Agent, or Firm* — MEITAR PATENTS LTD.

(57) ABSTRACT

In one embodiment, a device, includes a network interface to receive a SYN packet from a client via a packet data network to establish a connection with a server, and a processor to run an express data path (XDP) to accelerate at least a part of a SYN cookie connection process.

21 Claims, 5 Drawing Sheets

EFFICIENT CONNECTION PROCESSING

RELATED APPLICATION INFORMATION

The present application claims benefit of U.S. Provisional Patent Application Ser. Nos. 63/221,961 and 63/223,010 of Mykytianskyi, et al., filed 15 Jul. 2021 and 18 Jul. 2021, respectively, the disclosures of which are hereby incorporated herein by reference.

FIELD OF THE INVENTION

The present invention relates to computer systems, and in particular, but not exclusively, connection processing.

BACKGROUND

A Transmission Control Protocol (TCP) server exposed to the Internet may be exposed to an attacker who wants to disrupt the service by exhausting the server's resources for example using (distributed) denial of service attacks (Dos/DDoS). It may be assumed that the attacker is not "a man in the middle", because otherwise there are simpler ways to disrupt traffic such as blocking the traffic or sending TCP Reset (RST) packets. Classic DDoS techniques, such as bandwidth saturation attacks, can generally be mitigated by rate-limiting per source Internet Protocol (IP) address. However, SYN flood is a special case, and such mitigation does not work, because the attacker can spoof the IP address, hence a different approach is needed to address this attack. A legitimate client in this context is one who opens a TCP connection in a compliant way, by sending a SYN to the server, receiving a SYNACK from the server, and sending an ACK to the server in response to the SYNACK, without violating the TCP protocol or spoofing the source IP address. A malicious client (attacker) in this context is one who attempts to deploy a SYN flood or disrupt a SYN flood protection mechanism. The malicious client may send SYN packets without waiting for reply or performing further action. The malicious client may spoof its own source IP address and may send ACK packets trying to circumvent SYN cookies, described below.

Regarding SYN flood attacks, as TCP connection establishment is stateful, it is enough for a client to send a SYN to cause the server to allocate resources. A malicious client does not care about receiving a SYNACK reply, so the attacker can spoof the source IP address to circumvent possible limiting of rate of connections per source IP. Moreover, it is a fairly simple attack because it is very easy to generate SYN packets.

The above leads to the following consequences. By spoofing IP addresses, the attacker circumvents any rate limiting and easily fills up the socket's backlog queue with half-open connections, leading to denial of service for legitimate clients. The classic approach to mitigate this attack is to avoid allocating resources for malicious clients. The only reliable way to distinguish them from legitimate clients is by checking whether the clients respond to the SYNACK, which means the first stage of the 3-way handshake must be stateless. The solution should also not expose new attack vectors.

One classic approach to preventing SYN flood attacks is to use SYN cookies. Instead of storing the server state on the connection, the server makes the client remember the server state for it. The state is encoded in a sequence number (SYN cookie) and timestamp (TS cookie) and sent to the client with a SYNACK. Legitimate clients send the state back with an ACK packet, and the server can decode that ACK giving the connection state. Moreover, the state includes a cryptographically secure hash (based on a secret value known to the server), which the server can use to verify that the cookie was issued by this server to this client. After verifying that the client is legitimate and decoding the cookie, the server can allocate resources to the client.

Although in this approach SYNACKs are sent to potentially spoofed IP addresses, there is no amplification. The server no longer requires a SYN to open a connection. The secret value prevents the attacker from guessing a cookie and opening the connection with an ACK packet thereby skipping SYN. It makes IP address spoofing useless. A timer prevents the attacker from reusing stored ACK packets. In conclusion, SYN cookies successfully mitigate the dangers of SYN flood, making attackers switch to other attacks, which can be mitigated by other means (e.g., connection rate limiting per source IP address).

SUMMARY

There is provided in accordance with an embodiment of the present disclosure, a device, including a network interface to receive a SYN packet from a client via a packet data network to establish a connection with a server, and a processor to run an express data path (XDP) to accelerate at least a part of a SYNPROXY connection process.

Further in accordance with an embodiment of the present disclosure the XDP is configured to accelerate only a part of the SYN cookie connection process.

Still further in accordance with an embodiment of the present disclosure the processor is configured to run a SYNPROXY to perform another part of the SYN cookie connection process.

Additionally in accordance with an embodiment of the present disclosure the XDP is configured to store a state of the connection in a SYN cookie and a timestamp cookie responsively to the received SYN packet, generate a SYNACK packet including the SYN cookie and the timestamp cookie, and send the SYNACK packet to the client via the network interface.

Moreover, in accordance with an embodiment of the present disclosure the XDP is configured to set a window size of the SYNACK packet to zero.

Further in accordance with an embodiment of the present disclosure the network interface is configured to receive an ACK packet from the client responding to the SYNACK packet, the ACK packet including the SYN cookie and the timestamp cookie, the XDP being configured to verify the client sending the ACK packet responsively to the SYN cookie included in the ACK packet.

Still further in accordance with an embodiment of the present disclosure the received SYN packet includes a 5-tuple, the XDP is configured to generate a cryptographic hash responsively to a time value, the 5-tuple, and a secret value, the XDP is configured to store the cryptographic hash in the SYN cookie for sending in the SYNACK packet to the client, and the XDP is configured to verify the client responsively to the cryptographic hash stored in the SYN cookie included in the ACK packet.

Additionally in accordance with an embodiment of the present disclosure the processor is configured to restore the state from the SYN cookie and the timestamp cookie included in the ACK packet and establish the connection between the client and the server responsively to the XDP verifying the client.

Moreover, in accordance with an embodiment of the present disclosure the processor is configured to run a SYNPROXY to restore the state from the SYN cookie and the timestamp cookie included in the ACK packet and establish the connection between the client and the server responsively to the XDP verifying the client.

Further in accordance with an embodiment of the present disclosure, the device includes a firewall including the processor configured to run the XDP.

Still further in accordance with an embodiment of the present disclosure the XDP is configured to store a state of the connection in a SYN cookie and a timestamp cookie responsively to the received SYN packet, generate a SYN-ACK packet including the SYN cookie and the timestamp cookie, and send the SYNACK packet to the client via the network interface, the network interface is configured to receive an ACK packet from the client responding to the SYNACK packet, the ACK packet including the SYN cookie and the timestamp cookie, the XDP is configured to verify the client sending the ACK packet responsively to the SYN cookie included in the ACK packet, and the processor is configured to restore the state from the SYN cookie and the timestamp cookie included in the ACK packet and establish the connection between the client and the server via the firewall responsively to the XDP verifying the client.

Additionally in accordance with an embodiment of the present disclosure the processor is configured to run a SYNPROXY to restore the state from the SYN cookie and the timestamp cookie included in the ACK packet and establish the connection between the client and the server via the firewall responsively to the XDP verifying the client.

There is also provided in accordance with another embodiment of the present disclosure, a connection establishment method, including receiving a SYN packet from a client via a packet data network to establish a connection with a server, and running an express data path (XDP) to accelerate at least a part of a SYN cookie connection process.

Moreover, in accordance with an embodiment of the present disclosure the XDP accelerates only a part of the SYN cookie connection process.

Further in accordance with an embodiment of the present disclosure, the method includes running a SYNPROXY to perform another part of the SYN cookie connection process.

Still further in accordance with an embodiment of the present disclosure, the method includes the XDP storing a state of the connection in a SYN cookie and a timestamp cookie responsively to the received SYN packet, generating a SYNACK packet including the SYN cookie and the timestamp cookie, and sending the SYNACK packet to the client.

Additionally in accordance with an embodiment of the present disclosure, the method includes the XDP setting a window size of the SYNACK packet to zero.

Moreover, in accordance with an embodiment of the present disclosure, the method includes receiving an ACK packet from the client responding to the SYNACK packet, the ACK packet including the SYN cookie and the timestamp cookie, and the XDP verifying the client sending the ACK packet responsively to the SYN cookie included in the ACK packet.

Further in accordance with an embodiment of the present disclosure the received SYN packet includes a 5-tuple, the method further including the XDP generating a cryptographic hash responsively to a time value, the 5-tuple, and a secret value, the XDP storing the cryptographic hash in the SYN cookie for sending in the SYNACK packet to the client, and the XDP verifying the client responsively to the cryptographic hash stored in the SYN cookie included in the ACK packet.

Still further in accordance with an embodiment of the present disclosure, the method includes restoring the state from the SYN cookie and the timestamp cookie included in the ACK packet, and establishing the connection between the client and the server responsively to the XDP verifying the client.

Additionally in accordance with an embodiment of the present disclosure, the method includes running a SYNPROXY to restore the state from the SYN cookie and the timestamp cookie included in the ACK packet and establish the connection between the client and the server responsively to the XDP verifying the client.

Moreover, in accordance with an embodiment of the present disclosure the running of the XDP is performed on a firewall.

Further in accordance with an embodiment of the present disclosure, the method includes the XDP storing a state of the connection in a SYN cookie and a timestamp cookie responsively to the received SYN packet, the XDP generating a SYNACK packet including the SYN cookie and the timestamp cookie, the XDP sending the SYNACK packet to the client, receiving an ACK packet from the client responding to the SYNACK packet, the ACK packet including the SYN cookie and the timestamp cookie, the XDP verifying the client sending the ACK packet responsively to the SYN cookie included in the ACK packet, restoring the state from the SYN cookie and the timestamp cookie included in the ACK packet, and establishing the connection between the client and the server via the firewall responsively to the XDP verifying the client.

Still further in accordance with an embodiment of the present disclosure, the method includes running a SYNPROXY, wherein the restoring and the establishing is performed by the SYNPROXY.

There is also provided in accordance with still another embodiment of the present disclosure, a software product, including a non-transient computer-readable medium in which program instructions are stored, which instructions, when read by a processing unit, cause the processing unit to receive a SYN packet from a client via a packet data network to establish a connection with a server, and run an express data path (XDP) to accelerate at least a part of a SYN cookie connection process.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Unfortunately, SYN cookies are not ideal and have drawbacks. First, SYNACKs are not retransmitted if lost. However, this is a minor drawback as a legitimate client retransmits a SYN if needed. Second, and more importantly, some information is lost such as maximum segment size (MSS) being encoded in two bits thereby losing precision, and the client's initial sequence number is not stored. Additionally, if the client does not support TCP timestamping, some even more important information is lost such as Selective Acknowledgment (SACK) permission, window scale, and Explicit Congestion Notification (ECN) support, which affect the performance of the connection.

Additionally, there is no reliable way to detect loss of a client's first ACK and ask for retransmission. If it happens, and the server receives a second ACK, the server tries to check the SYN cookie for it. Due to specifics of Linux implementation, which encodes the client's initial sequence number in the SYN cookie, the server either drops the connection or, if the lost packet is not bigger than 3 bytes, the connection survives, these few bytes are lost, and the MSS value is decoded incorrectly.

SYN flood attacks may be mitigated by placing a firewall between the server and clients. The firewall generates SYN cookies on behalf of the server thereby mitigating SYN flood attacks. When a client sends a SYN, the firewall generates a SYN and timestamp cookie and replies with a SYNACK while setting TCP window size to zero. Only after the client sends an ACK, the firewall opens a real connection with the server and performs a 3-way handshake. The ACK cannot contain any payload as the window size of the SYNACK was set to zero. After the firewall successfully establishes the connection with the server, the firewall sends another ACK to the client with a non-zero window, permitting sending data, and establishes bidirectional data transfer. Since the firewall cannot control the server's initial sequence number and initial timestamp, the initial sequence number and initial timestamp are different from values sent by the firewall to the client. The firewall ends up proxying all traffic and rewriting server sequence numbers and timestamps, shifting them by given offsets.

The firewall solution may be implemented as an iptables module. iptables is a user-space utility program that allows a system administrator to configure the IP packet filter rules of the Linux kernel firewall, implemented as different Netfilter modules. The filters are organized in different tables, which contain chains of rules for how to treat network traffic packets. The abovementioned drawbacks of SYN cookies still apply with the firewall solution, except the adverse effects of dropping the first ACK, because it cannot hold payload. On the other hand, there are a few other inconveniences such as the latency of connection establishment is increased due to blocking the client from sending data until the final connection is established and another ACK is sent to the client. Also, SYNPROXY needs to know in advance the server's MSS and window scale.

Embodiments of the present invention improve the firewall solution by running an express data path (XDP) to accelerate at least a part of a SYN cookie connection process. XDP accelerates bottleneck steps, such as generating and checking SYN cookies, thereby allowing stronger SYN flood attacks to be withstood. In some embodiments, some of the SYN cookie connection process is accelerated by XDP and some of the SYN cookie connection process is performed by SYNPROXY. XDP may be used to optimize generating and checking SYN cookies (which are stateless) by performing these tasks early in the packet processing pipeline and saving time that would otherwise be spent on creating a socket buffer (SKB) and traversing the networking stack and iptables rules. The XDP optimization increases the packet processing speed, making the firewall more resilient to stronger attacks. Alternatively, the firewall can run on a lower-end machine, such as DPU (data processing unit) inside a network interface controller (MC), without sacrificing the baseline performance of SYNPROXY.

In some embodiments, XDP may perform the stateless operations such as generating SYN and timestamp cookies, sending a SYNACK with the SYN and timestamp cookies therein, and checking the SYN (and timestamp) cookie upon receiving an ACK from the client. Once XDP completes verification of the client sending the ACK packet (via checking the SYN cookie), the SYN and timestamp cookies (optionally in the ACK packet) are passed to SYNPROXY which restores the state of the connection and establishes a connection between the client and the server.

System Description

Figure 1:
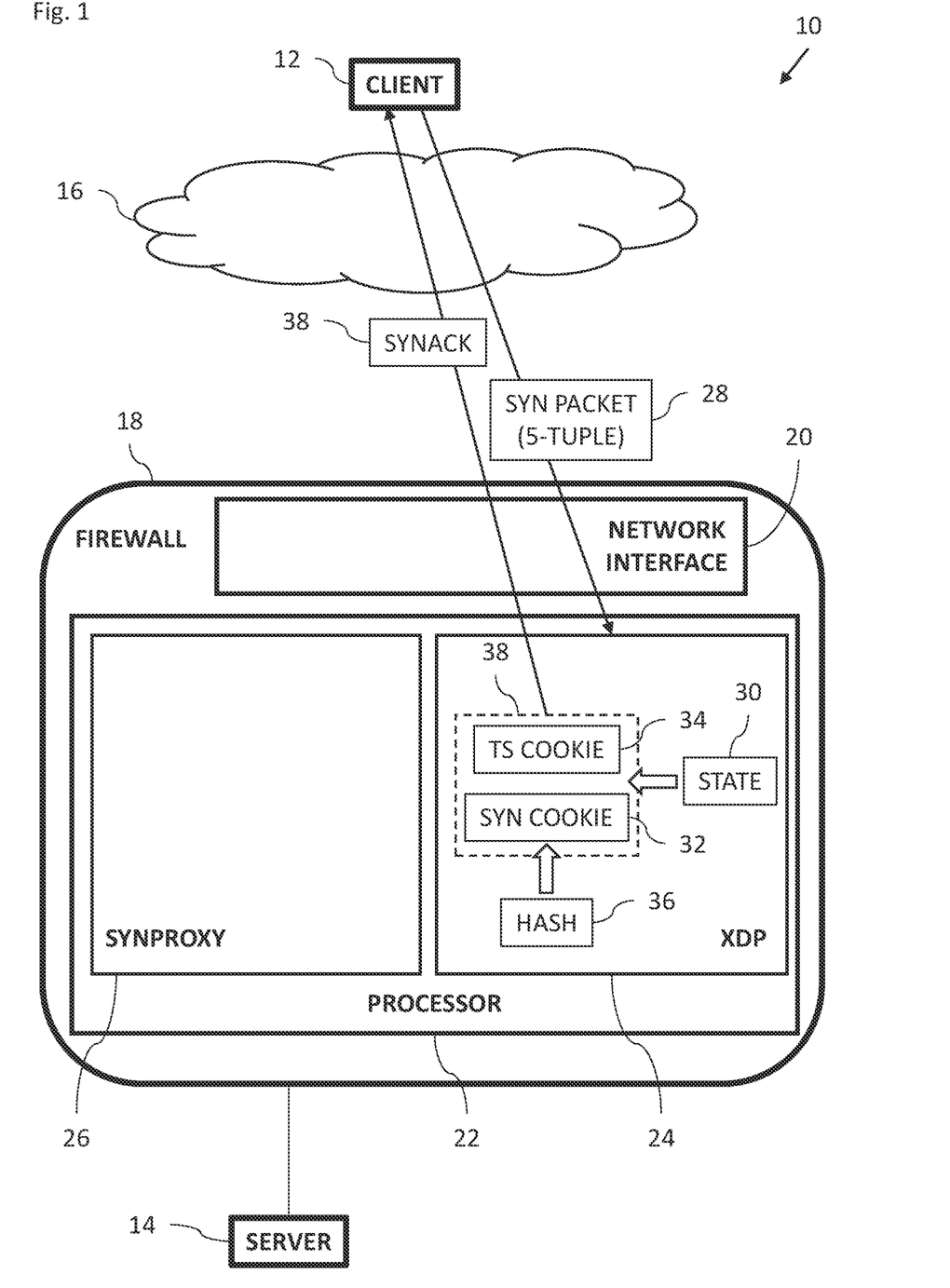
FIG. 1 is a computer system constructed and operative in accordance with an embodiment of the present invention.

Reference is now made to FIG. 1, which is a computer system 10 constructed and operative in accordance with an embodiment of the present invention. The system 10 includes clients 12 (only one client 12 shown for the sake of simplicity), and a server 14 configured to communicate with clients 12 via a packet data network 16. The computer system 10 also includes a firewall device 18 disposed between the server 14 and clients 12. The firewall device 18 is a device which is configured to block unauthorized access to the server 14 while permitting outward communication from the server 14. The firewall device 18 may be implemented as a peripheral device to the server 14 or to multiple servers. In some embodiments, the firewall device 18 includes a network interface controller (not shown) including a physical layer (PHY) chip and a MAC chip to process received packets and process packets to be sent over the network 16 to the client 12. The firewall device 18 may be connected to the server 14 via a wireless or wired connection, for example, via a peripheral communication bus connection such as peripheral component interconnect express (PCIe).

The firewall device 18 includes a network interface 20 (for example, as part of a network interface controller) to receive packets from, and send packets to, the client 12 over the network 16. The firewall device 18 also includes a processor 22 such as a data processing unit (DPU) or a central processing unit (CPU) or any suitable processor. The processor 22 may be configured to run XDP 24 and SYN-PROXY 26.

In practice, some or all of the functions processor 22 may be combined in a single physical component or, alternatively, implemented using multiple physical components. These physical components may comprise hard wired or programmable devices, or a combination of the two. In some embodiments, at least some of the functions of the processor 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
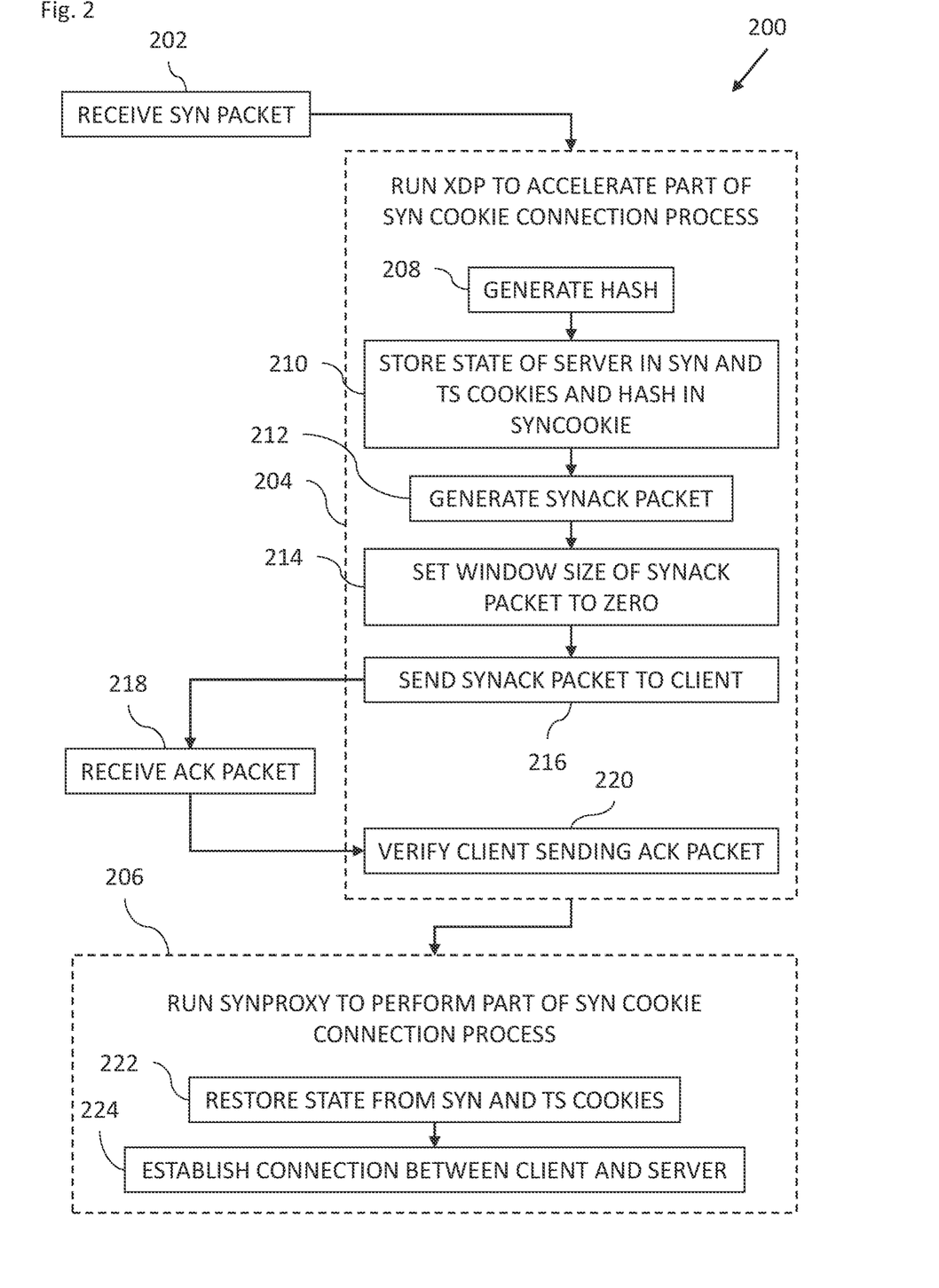
FIG. 2 is a flowchart including steps in a method of operation of the computer system of FIG. 1.

Reference is now made to FIG. 2, which is a flowchart 200 including steps in a method of operation of the computer system 10 of FIG. 1. Reference is also made to FIG. 1.

The network interface 20 is configured to receive a SYN packet 28 from the client 12 via the network 16 to establish a connection with the server 14 (block 202). In some embodiments, the received SYN packet 28 includes a 5-tuple (e.g., in the IP header). A 5-tuple refers to a set of five different values that comprise a Transmission Control Protocol/Internet Protocol (TCP/IP) connection. The 5-tuple includes a source IP address and port number, destination IP address and port number and the protocol in use.

The processor 22 is configured to run XDP 24 to accelerate at least a part of a SYN cookie connection process (block 204). In some embodiments, XDP 24 is configured to accelerate only a part of the SYN cookie connection process, for example, the steps of blocks 208-216, 220 described in more detail below. The SYN cookie connection process is defined to include generating a SYN and timestamp cookie in response to receiving a SYN packet, generating a SYN-ACK packet, verifying the client 12 sending an ACK packet, restoring a state from the SYN and timestamp cookie described in more detail below. The processor 22 is configured to run SYNPROXY 26 to perform another part of the SYN cookie connection process (block 206) including one or more of the steps of blocks 222-224. In some embodiments, the distribution of the steps of the blocks 208-224 performed by XDP 24 and SYNPROXY 26 may differ than shown in FIG. 2.

XDP 24 is configured to generate a cryptographic hash 36 with a secret value responsively to various values such as a sequence number of the client 12, a time value, the 5-tuple in the header of the SYN packet, an encoded MSS value (e.g., two bits of the 16-bit MSS value encoded into two bits) (block 208). The time value may be a current counter value or other clock value maintained by the firewall device 18. The cryptographic hash 36 may be computed using a suitable cryptographic hash function. XDP 24 is configured to store a state 30 of the connection in a SYN cookie 32 and a timestamp cookie 34 responsively to the received SYN packet 28. For example, the state 30 may include the encoded MSS value being stored in the SYN cookie 32 and other values (such as whether ECN and SACK are supported by the client 12 as negotiated between the client 12 and the firewall device 18, and a window scaling value from the firewall device 18 configuration) being stored in the timestamp cookie 34. XDP 24 is configured to store the cryptographic hash 36 in the SYN cookie 32 (for sending in a SYNACK packet 38 to the client) (block 210). The time value (or most significant values of the time value) may optionally be stored in the timestamp cookie 34.

XDP 24 is configured to generate the SYNACK packet 38 comprising the SYN cookie 32 and the timestamp cookie 34 (block 212). The SYN cookie 32 may be placed in a sequence number field of the TCP options of the TCP header, and the timestamp cookie 34 may be placed in a time field of the TCP options. In some embodiments, XDP 24 is configured to set a window size of the SYNACK packet 38 to zero (block 214). XDP 24 is configured to send the SYNACK packet 38 to the client 12 via the network interface 20 (block 216).

Figure 3:
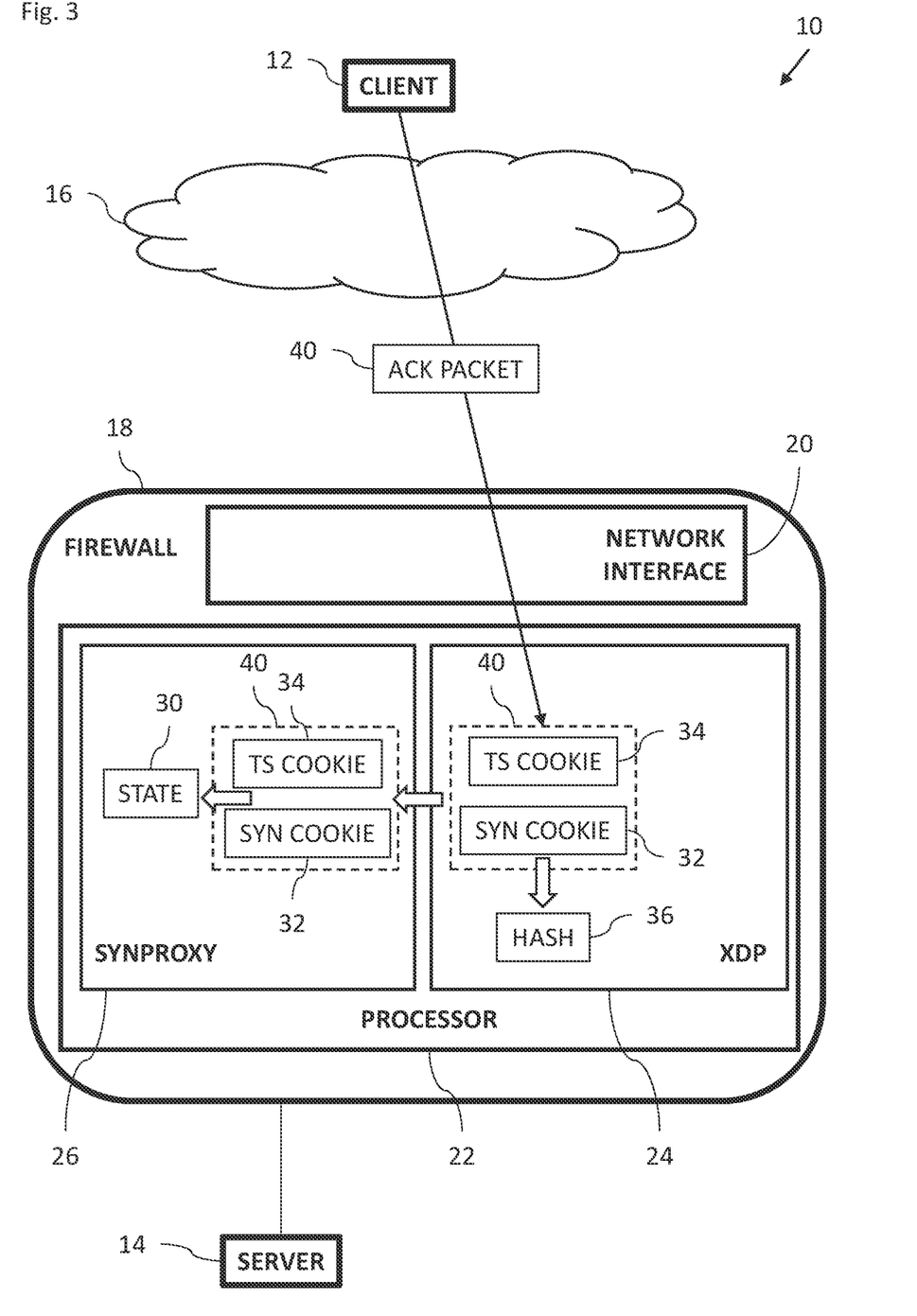
FIG. 3 is a schematic view of the system of FIG. 1 showing processing of an ACK packet.

Reference is now made to FIG. 3, which is a schematic view of the system 10 of FIG. 1 showing processing of an ACK packet 40. Reference is also made to FIG. 2.

The client 12 responds to receiving the SYNACK packet 38 by generating the ACK packet 40, which includes the SYN cookie 32 and timestamp cookie 34 included in the SYNACK packet 38. In some embodiments, the client 12 may change the SYN cookie 32 by a given offset, e.g., an offset of 1 with TCP. The network interface 20 is configured to receive the ACK packet 40 from the client 12 responding to the SYNACK packet 38 (block 218). The received ACK packet 40 includes the SYN cookie 32 and the timestamp cookie 34.

XDP 24 is configured to verify the client 12 sending the ACK packet 40 responsively to the SYN cookie 32 included in the ACK packet 40 (block 220). In some embodiments, XDP 24 is configured to verify the client 12 responsively to the cryptographic hash 36 stored in the SYN cookie 32 included in the ACK packet 40. For example, XDP 24 may be configured to perform a hash computation using the secret stored by the firewall device 18 and the following values such as the sequence number of the client 12, the time value (which may be based on a counter as mentioned above) included in the SYN cookie 32, the 5-tuple data included in the header of the ACK packet 40, and the encoded MSS value. In some embodiments, XDP 24 verifies that encoded MSS value is in the range of 0 to 3, i.e., a valid 2-bit value. If the encoded MSS value is not in this range, the SYN cookie is treated as invalid. Setting the window size in the SYNACK packet 38 to zero prevents the client 12 from sending any data in the first ACK packet 40 thereby preventing uncertainties when decoding the encoded MSS value. The resulting hash is then compared to the cryptographic hash 36 included in the SYN cookie 32 to verify the client 12. In response to positively verifying the client 12 (and confirming that the given time period has not elapsed between sending the SYNACK packet 38 and receiving the ACK packet 40), XDP 24 is configured to pass the SYN cookie 32 and the timestamp cookie 34 (typically with the ACK packet 40) to SYNPROXY 26.

The processor 22 is configured, responsively to XDP 24 verifying the client 12 (and confirming that the given time period has not elapsed) (in the step of block 220), to run SYNPROXY 26 to restore the state 30 of the connection from the SYN cookie 32 and the timestamp cookie 34 included in the ACK packet 40 (block 222) and establish a connection between the client 12 and the server 14 (via the firewall device 18) (block 224). Restoring the state 30 of the connection may include retrieving one or more of the following values from the SYN cookie 32 and the timestamp cookie 34: MSS, ECN, SACK, and window scaling values.

Figure 4:
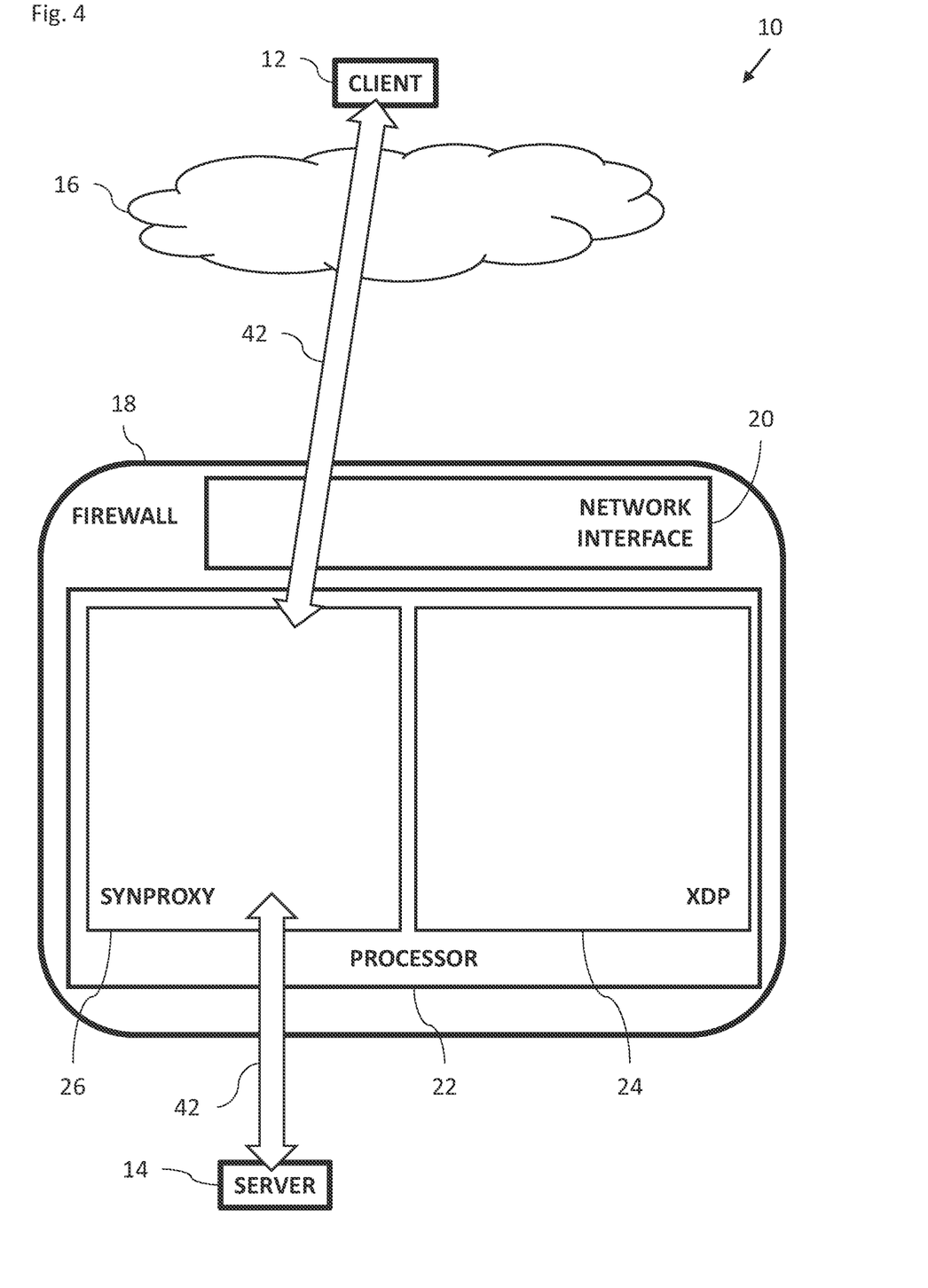
FIG. 4 is a schematic view of the system of FIG. 1 showing establishing a connection between a client and a server.

Reference is now made to FIG. 4, which is a schematic view of the system 10 of FIG. 1 showing establishing a connection 42 between the client 12 and the server 14. Reference is also made to FIG. 2. Responsively to XDP 24 verifying the client (and confirming that the given time period has not elapsed), the SYNPROXY 26 running on the processor 22 of the firewall device 18 restores the state 30 and opens a real connection with the server 14. After the firewall device 18 successfully establishes the connection with the server 14, the firewall device 18 sends another ACK to the client 12 with a non-zero window, permitting sending data, and establishes bidirectional data transfer between the client 12 and server 14. Since the firewall device 18 cannot control the server's initial sequence number and initial timestamp, the initial sequence number and initial timestamp are different from values sent by the firewall device 18 to the client 12. The firewall device 18 ends up proxying all traffic and rewriting server sequence numbers and timestamps, shifting them by given offsets.

Figure 5:
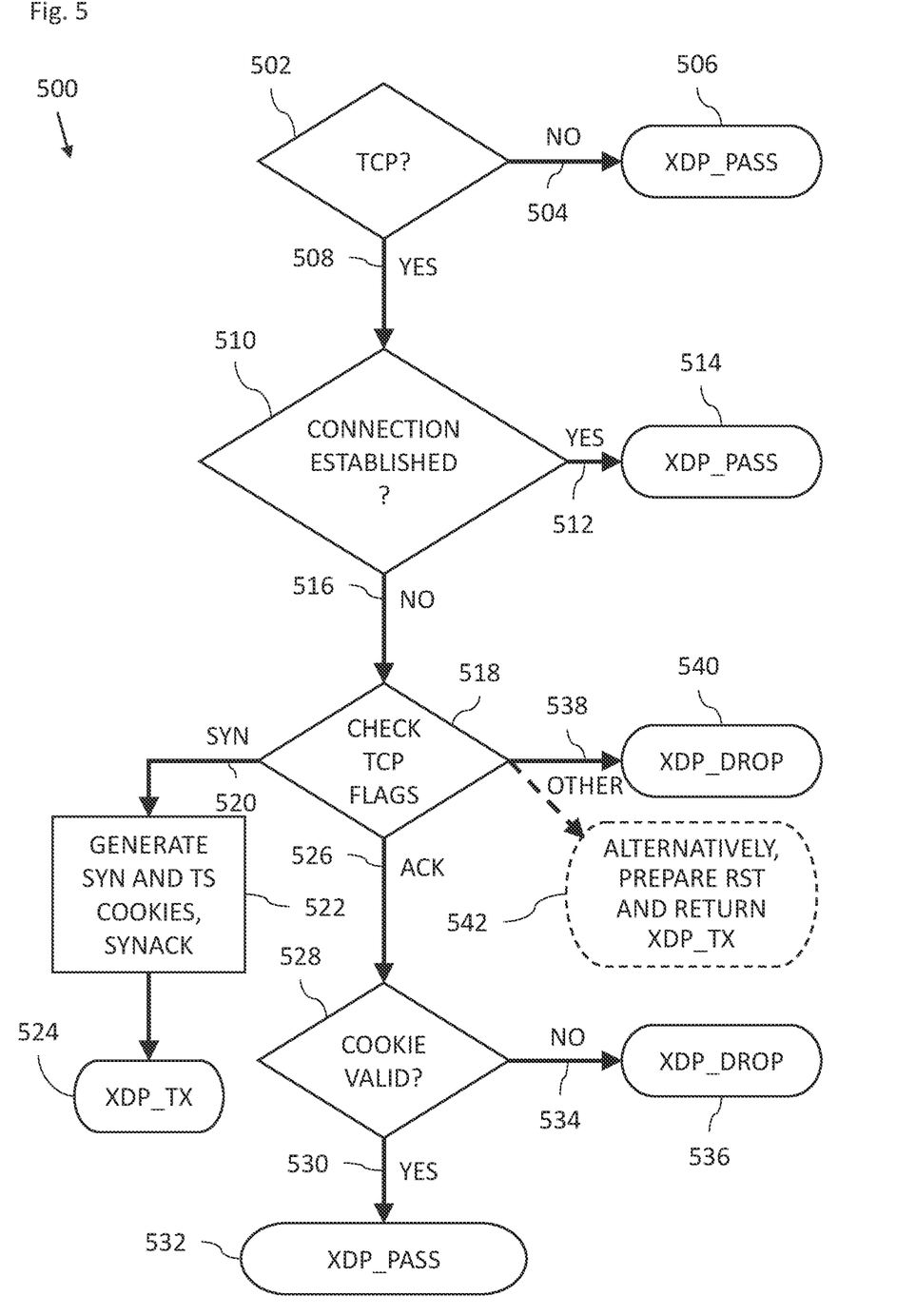
FIG. 5 is a flowchart including steps in a method of XDP processing in the system of FIG. 1.

Reference is now made to FIG. 5, which is a flowchart 500 including steps in a method of XDP processing in the system 10 of FIG. 1.

At a decision block 502, XDP 24 running on the processor 22 checks whether a received packet is TCP or not. If the packet is not TCP (branch 504), XDP 24 returns an action code "XDP_PASS", which indicates that the received packet should continue through the network stack (block 506). If the packet is a TCP packet (branch 508), processing continues at a decision block 510 in which XDP 24 checks whether a connection is established (e.g., by checking Conntrack) with the client sending the received packet. If a connection is established (branch 512), the XDP 24 returns an action code "XDP_PASS", which indicates that the received packet should continue through the network stack (block 514). If a connection is not established (branch 516), processing continues at a decision block 518 in which XDP 24 checks the TCP flags of the received packet. If the received packet is a SYN packet (branch 520), XDP 24 generates SYN and timestamp (TS) cookies and the SYN-ACK packet 38 (block 522) and returns an action code "XDP_TX", which indicates that the SYNACK packet 38 should be bounced back to the same NIC that the SYN packet arrived from (block 524). If the received packet is an ACK packet (branch 526), processing continues at a decision block 528 in which XDP 24 checks if the SYN cookie included in the received ACK packet is valid, and that a given time period has not elapsed since the SYNACK was sent. If the SYN cookie is valid (and the given time period has not elapsed) (branch 530), XDP 24 returns an action code "XDP_PASS", which indicates that the received packet should continue through the network stack (block 532) for further processing by SYNPROXY 26. If the SYN cookies is invalid (or the given time period has elapsed) (branch 534), XDP 24 returns an action code "XDP_DROP", which indicates that the received packet should be silently dropped (block 536).

Returning now to decision block 518, if the received packet is not a SYN packet or an ACK packet (branch 538), XDP 24 returns an action code "XDP_DROP", which indicates that the received packet should be silently dropped (block 540). Alternatively, if the received packet is not a SYN packet or an ACK packet, XDP 24 prepares a TCP Reset (RST) packet and returns an action code "XDP_TX", which indicates that the RST packet should be bounced back to the same NIC that the received packet arrived from (block 542).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A firewall device, comprising:
a network interface controller (NIC) including a physical layer (PHY) chip;
a network interface to receive a SYN packet from a client via a packet data network to establish a connection with a server; and
a processor to run an express data path (XDP) to accelerate at least a part of a SYN cookie connection process, wherein the XDP is to:
store a state of the connection in a SYN cookie and a timestamp cookie responsively to the received SYN packet;
generate a SYNACK packet comprising the SYN cookie and the timestamp cookie;
send the SYNACK packet to the client via the network interface; and
set a window size of the SYNACK packet to zero.

2. The device according to claim 1, wherein the XDP is configured to accelerate only a part of the SYN cookie connection process.

3. The device according to claim 1, wherein the processor is configured to run a SYNPROXY to perform another part of the SYN cookie connection process.

4. The device according to claim 1, wherein the network interface is configured to receive an ACK packet from the client responding to the SYNACK packet, the ACK packet including the SYN cookie and the timestamp cookie, the XDP being configured to verify the client sending the ACK packet responsively to the SYN cookie included in the ACK packet.

5. The device according to claim 4, wherein:
the received SYN packet includes a 5-tuple;
the XDP is configured to generate a cryptographic hash responsively to a time value, the 5-tuple, and a secret value;
the XDP is configured to store the cryptographic hash in the SYN cookie for sending in the SYNACK packet to the client; and
the XDP is configured to verify the client responsively to the cryptographic hash stored in the SYN cookie included in the ACK packet.

6. The device according to claim 4, wherein the processor is configured to restore the state from the SYN cookie and the timestamp cookie included in the ACK packet and establish the connection between the client and the server responsively to the XDP verifying the client.

7. The device according to claim 4, wherein the processor is configured to run a SYNPROXY to restore the state from the SYN cookie and the timestamp cookie included in the ACK packet and establish the connection between the client and the server responsively to the XDP verifying the client.

8. The device according to claim 1, further comprising a firewall including the processor configured to run the XDP.

9. The device according to claim 8, wherein:
the XDP is configured to:
store a state of the connection in the SYN cookie and the timestamp cookie responsively to the received SYN packet;
generate the SYNACK packet comprising the SYN cookie and the timestamp cookie; and
send the SYNACK packet to the client via the network interface;
the network interface is configured to receive an ACK packet from the client responding to the SYNACK packet, the ACK packet including the SYN cookie and the timestamp cookie;
the XDP is configured to verify the client sending the ACK packet responsively to the SYN cookie included in the ACK packet; and
the processor is configured to restore the state from the SYN cookie and the timestamp cookie included in the ACK packet and establish the connection between the client and the server via the firewall responsively to the XDP verifying the client.

10. The device according to claim 9, wherein the processor is configured to run a SYNPROXY to restore the state from the SYN cookie and the timestamp cookie included in the ACK packet and establish the connection between the client and the server via the firewall responsively to the XDP verifying the client.

11. A connection establishment method, comprising:
receiving a SYN packet from a client via a packet data network to establish a connection with a server; and
running an express data path (XDP) to accelerate at least a part of a SYN cookie connection process
further comprising the XDP:
storing a state of the connection in a SYN cookie and a timestamp cookie responsively to the received SYN packet;
generating a SYNACK packet comprising the SYN cookie and the timestamp cookie;
sending the SYNACK packet to the client; and
setting a window size of the SYNACK packet to zero.

12. The method according to claim 11, wherein the XDP accelerates only a part of the SYN cookie connection process.

13. The method according to claim 11, further comprising running a SYNPROXY to perform another part of the SYN cookie connection process.

14. The method according to claim 11, further comprising:
receiving an ACK packet from the client responding to the SYNACK packet, the ACK packet including the SYN cookie and the timestamp cookie; and
the XDP verifying the client sending the ACK packet responsively to the SYN cookie included in the ACK packet.

15. The method according to claim 14, wherein the received SYN packet includes a 5-tuple, the method further comprising:
the XDP generating a cryptographic hash responsively to a time value, the 5-tuple, and a secret value;
the XDP storing the cryptographic hash in the SYN cookie for sending in the SYNACK packet to the client; and
the XDP verifying the client responsively to the cryptographic hash stored in the SYN cookie included in the ACK packet.

16. The method according to claim 14, further comprising:
restoring the state from the SYN cookie and the timestamp cookie included in the ACK packet; and
establishing the connection between the client and the server responsively to the XDP verifying the client.

17. The method according to claim 14, further comprising running a SYNPROXY to restore the state from the SYN cookie and the timestamp cookie included in the ACK packet and establish the connection between the client and the server responsively to the XDP verifying the client.

18. The method according to claim 11, wherein the running of the XDP is performed on a firewall.

19. The method according to claim 18, further comprising:
the XDP storing a state of the connection in the SYN cookie and the timestamp cookie responsively to the received SYN packet;
the XDP generating the SYNACK packet comprising the SYN cookie and the timestamp cookie;
the XDP sending the SYNACK packet to the client;
receiving an ACK packet from the client responding to the SYNACK packet, the ACK packet including the SYN cookie and the timestamp cookie;
the XDP verifying the client sending the ACK packet responsively to the SYN cookie included in the ACK packet;
restoring the state from the SYN cookie and the timestamp cookie included in the ACK packet; and
establishing the connection between the client and the server via the firewall responsively to the XDP verifying the client.

20. The method according to claim 19, further comprising running a SYNPROXY, wherein the restoring and the establishing is performed by the SYNPROXY.

21. A software product, comprising a non-transient computer-readable medium in which program instructions are stored, which instructions, when read by a processing unit, cause the processing unit to:
receive a SYN packet from a client via a packet data network to establish a connection with a server; and
run an express data path (XDP) to accelerate at least a part of a SYN cookie connection process, wherein the XDP is to:
store a state of the connection in a SYN cookie and a timestamp cookie responsively to the received SYN packet;
generate a SYNACK packet comprising the SYN cookie and the timestamp cookie;
send the SYNACK packet to the client via the network interface; and
set a window size of the SYNACK packet to zero.

* * * * *